July 21, 1959 W. J. BECK ET AL 2,895,247
PHOTOGRAPHIC SLIDE CLIP
Filed Sept. 16, 1957
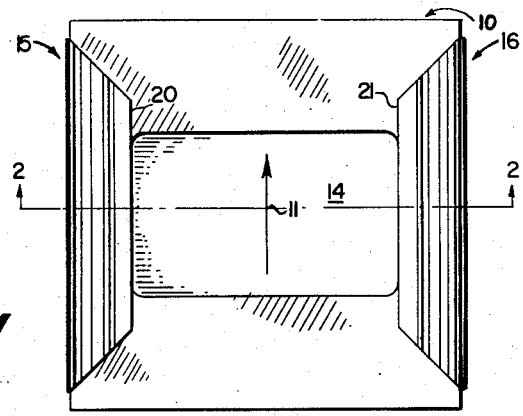
FIG. 1
FIG. 7
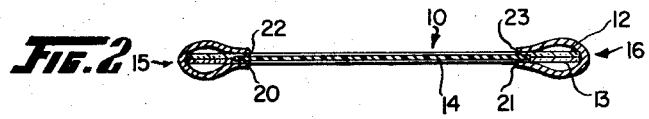
FIG. 2
FIG. 3
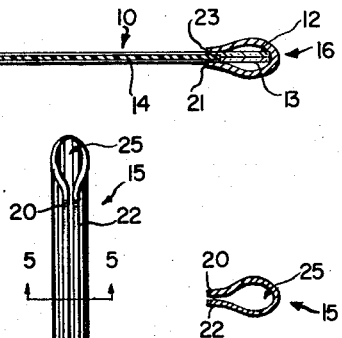
FIG. 4
FIG. 5
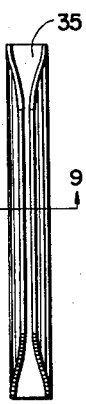
FIG. 8
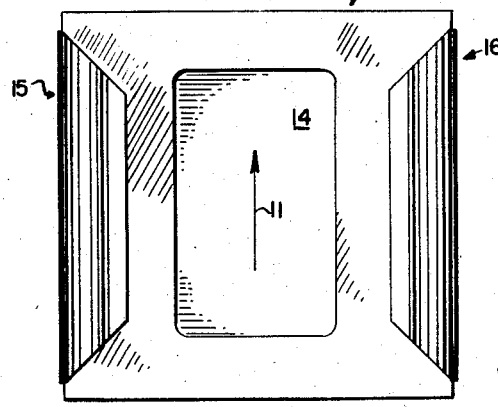
FIG. 6
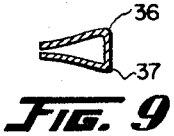
FIG. 9
INVENTOR.
WILLIAM J. BECK
DONALD F. FAZENDIN
BY
ATTORNEY ize="2,895,247"
Patented July 21, 1959

2,895,247

PHOTOGRAPHIC SLIDE CLIP

William J. Beck and Donald F. Fazendin, Minneapolis, Minn., assignors to Minneapolis-Honeywell Regulator Company, Minneapolis, Minn., a corporation of Delaware Application September 16, 1957, Serial No. 684,257

1 Claim. (Cl. 40—152)

The present invention is concerned with a photographic slide clip and more particularly with a photographic slide clip adapted for use with the conventional cardboard type ready-mount. Such a ready-mount is composed of two cardboard members, or one cardboard member folded over, and glued together, generally by a thermo-setting glue. A photographic transparency is held between the cardboard and positioned in a centrally positioned aperture or opening to provide a mounted photographic transparency which is adapted to be projected on a screen.

The so-called miniature or 35 mm. camera produces such a transparency. The exposures made with this camera may be on black and white film or on color film. It is possible for the photographer to have the exposed film processed and returned uncut, leaving the mounting up to the photographer. The more popular method is to have the film processed, cut, and mounted by the processor. In this case each individual picture or transparency is mounted in the above mentioned ready-mount. This ready-mount, in the case of the 35 mm. film, is approximately 2" by 2" square and is provided with a centrally located aperture or opening of approximately 1" x 1½".

If the photographer elects to have his film processed uncut, the photographer then cuts the film into the individual transparencies and mounts the individual transparencies either in a cardboard type of ready-mount or into a more permanent and expensive mount, called a permanent slide binder. These permanent slide binders take a variety of forms and are provided with a pair of glass plates which are positioned one on each side of the photographic transparency. The slide binders are provided with further members, usually metal, which lock the two glass plates together, imprisoning the photographic transparency between the plates. In some cases, these further members take the form of clasp strips or clips which are positioned along the edges of the glass plates to hold the glass plates in assembled relation.

The present invention is concerned with a means of improving the ready-mount type of unit by the provision of a clip which is positioned along the cardboard edge of the ready-mount. The clip of this invention does not hold the cardboard and transparency in assembled relation but rather serves to stiffen the cardboard ready-mount and to provide a wider edge. Such a construction provides many of the advantages of the permanent type slide binder while being much less expensive, and at least in one case, namely that of the moisture accumulating between the glass plates of the permanent slide binder, the present invention constitutes an advancement from the operational standpoint as well as from the economy standpoint.

As is well known, the photographic transparencies, whether mounted in the ready-mount or the permanent slide binder, are used either in a relatively small hand-held viewer or a photographic projector capable of projecting the transparency on a screen. In the case of the photographic projector, the transparency is subjected to considerable heat and, while many projectors are provided with a blower for cooling, there is a tendency for the transparency to warp or pop and thereby necessitate refocusing of the projector. This warping occurs predominantly with the ready-mount type slide since in the permanent type slide binder this warping is prevented by the transparency being imprisoned between the two glass plates. The clip of the present invention tends to eliminate such warping.

Furthermore, with all types of projectors and hand viewers a certain amount of wear occurs on the cardboard type ready-mount and the edges of the mount tend to fray and tend to foul the operation of the viewer or projector. The photographic slide clip of the present invention protects the ready-mount against such wear.

In photographic projectors of the automatic and semi-automatic type, a tray is provided to hold a plurality of slides, for example 40 slides, and these slides are moved in and out of the projection chamber of the projector, the slide tray being automatically advanced one slide each time the slide operating member is manipulated. An example of such a semi-automatic projector is shown in the Ernest W. Goldberg Patent 2,756,630. These slide trays have individual compartments for each slide and these compartments of necessity must be wide enough to accommodate the permanent type slide binder. However, in many cases the users of these projectors do not wish to go to the expense and trouble of mounting their photographic transparencies in a permanent binder but rather use the transparencies directly in the cardboard ready-mount. This cardboard ready-mount is relatively thin compared to the permanent type slide binder and as a result of this the cardboard ready-mount is rather loosely positioned in the slide tray compartment. Because of this, many times the operating member of the projector does not pick up the ready-mount slide as it moves through the slide tray compartment. This not only causes this particular slide to be missed in the sequence of the slide tray, but also causes the previous slide to be followed by a flooding of the projection screen with bright light. The photographic slide clip of the present invention overcomes this difficulty by providing a larger edge surface on the ready-mount to insure proper operation when used in the semi-automatic or automatic type projectors.

Keeping the foregoing discussion in mind, it is an object of the present invention to provide a protective clip for use with a cardboard ready-mount which comprises a folded member of relatively thin resilient material, provided with aligned edges opposite the fold, the inside dimension defining an internal channel which is adapted to receive the edge of the ready-mount, and the aligned edges resiliently holding the ready-mount.

It is a further object of the present invention to provide the combination of a relatively thin cardboard ready-mount and a protective clip, wherein the protective clip is formed of a thin resilient material which is folded, with the folded portions of the clip extending away from the fold and forming a pair of mating fingers resiliently biased toward each other and separated by a distance less than the thickness of the ready-mount, the fold of the clip having an outer dimension greater than the thickness of the ready-mount, the clip thereby resiliently holding the ready-mount and providing a more durable and a thicker edge against which a photographic projector operating member may work.

It is a further object of the present invention to provide the combination above described wherein the protective clip provides more rigid mating fingers extending away from the fold to a distance equal to the distance that the centrally spaced opening in the ready-mount is spaced from the edge of the ready-mount to thereby retard warping of the photographic transparency under the heat of a projection lamp.

These and other objects of the present invention will be apparent to those skilled in the art upon reference to the following specification, claim, and drawings of which:

Figure 1 is a plan view showing a 35 mm. type ready-mount wherein the major length of the transparency is disposed horizontally, the ready-mount being provided with two of the clips of the present invention, Figure 2 is a section view of the arrangement of Figure 1, Figure 3 is a plan view of one of the protective clips of Figure 1, Figure 4 is a view of the clip of Figure 3, looking into the open channel which receives the edge of the ready-mount, Figure 5 is a section view of the clip of Figure 4, Figure 6 is a further plan view of a 35 mm. ready-mount wherein the major length of the transparency is disposed vertically, the ready-mount being provided with two of the clips of the present invention, Fig. 7 is a plan view of a modified protective clip.

Figure 8 is a view of the clip of Figure 7, looking into the open channel which receives the edge of the ready-mount, and Figure 9 is a section view of the clip of Figure 8.

Referring to Figure 1, the reference numeral 10 designates a photographic ready-mount. This particular ready-mount is the so-called 35 mm. slide which has an outer dimension of approximately 2" x 2". A 35 mm. camera provides a photographic transparency which is rectangular in shape and approximately 1" x 1½" in size. The particular subject which has been photographed may be either aligned along the major axis of the transparency or perpendicular to this major axis. In Figures 1 and 6 the object photographed is represented by an arrow designated by the reference numeral 11. In Figure 1 the camera was held such that the subject 11 is perpendicular to the major axis of the transparency while in Figure 6 the camera was held such that the subject 11 is parallel to the major axis of the transparency.

Referring now to Figure 2, a section view of Figure 1 shows more clearly the structure of the ready-mount 10. This ready-mount consists of two cardboard members 12 and 13 which are glued together at the contacting surfaces and support a photographic transparency 14 in the opening or aperture provided in the cardboard members 12 and 13 of the ready-mount. This ready-mount represents the manner in which an exposed film is returned by the film processor to the photographer. If it is desired to mount the transparency 14 in a permanent slide binder, the transparency 14 is removed from between the cardboard members 12 and 13 and placed in a ready-mount. As mentioned, this is a relatively expensive procedure and it is quite common for the photographer to use the ready-mount just as it is received from the film processor.

As pointed out above, whether the ready-mount 10 is used in a manually operated projector, a semi-automatic projector or a completely automatic projector, the cardboard edges of the ready-mount 10 tend to fray and as the cardboard ready-mount is used it tends to foul in the projector. This is particularly true of the semi-automatic and automatic projectors in which the ready-mount is contained in a tray having compartments of relatively large width compared to the thickness of the ready-mount. The compartments of the slide tray are designed to receive not only the cardboard ready-mount 10 but also the relatively thick permanent slide binder. It has been observed that the operating members of the projector sometimes passes through the compartment of the slide tray without picking up the ready-mount and in this case this particular slide is missed in the sequence of the slide tray and the viewers are presented with a bright screen illuminated by the projector bulb.

The present invention overcomes this difficulty by providing a relatively inexpensive clip member, two of which are identified by the reference numerals 15 and 16 of Figures 1 and 2. These clip members are preferably formed of a piece of resilient metal, for example, an aluminum alloy, which is generally rectangular in shape and which has been folded along the major axis thereof to provide a channel-like opening to loosely receive the edge of the ready-mount. The major length of the clips 15 and 16 is approximately equal to the height of the ready-mount 10 and thereby provide a relatively long bearing surface against which the operating members of a photographic slide projector may work. The folded over portions of the clips 15 and 16 are extended inwardly from the fold a distance approximately equal to the distance that the edge of the transparency 14 is set in from the edge of the cardboard ready-mount 10. These folded over portions, or aligned edges, are identified by the reference numerals 20 and 21 in Figure 1 and by the reference numerals 20, 21, 22 and 23 in Figure 2.

Referring specifically to the clip member 15, this clip member is shown in three views in Figures 3, 4 and 5. Figure 3 is substantially the same as the showing of this clip member in Figure 1 and shows the clip member as it appears before it is pressed or slipped over the edge of the ready-mount 10, as has been done in Figure 1. Figure 4 is a view of the clip 15 showing the spacing of the mating fingers 20 and 22 and showing the inner channel which has been identified by the reference numeral 25. This channel is adapted to receive the edge of the ready-mount 10, as clearly shown in Figure 2. Figure 5 is a section view of clip 15 and this view shows not only the channel or tube 25 but also the spacing of the fingers 20 and 22. A comparison of Figure 5 with Figure 2 shows that the fingers 20 and 22 are formed so that the spacing between these fingers is less than the thickness of the ready-mount 10 and the edge of the ready-mount is easily received in the channel 25, abutting the inside surface thereof. When the clip 15 is positioned over the ready-mount 10, the fingers 20 and 22 are moved apart to receive the ready-mount and these fingers resiliently hold the ready-mount.

As mentioned previously, the photographic transparency 14, whether it is mounted in a ready-mount 10 or a permanent slide binder, is adapted to be received in a photographic projector which subjects the transparency 14 to a rather intense light and likewise to an intense heat. Many projectors are provided with a blower to cool the transparency 14 and while this is somewhat effective, there is still a general tendency for the transparency 14 to expand and buckle or warp, thereby throwing the projector out of focus and necessitating refocussing of the projector to produce a clear image on the screen. This effect is eliminated in the permanent slide binder where the transparency 14 is supported between two glass plates. However, in the ready-mount such as 10, this popping or buckling occurs quite frequently. To eliminate, or at least retard this effect, the clips 15 and 16 of the present invention are formed such that the extending finger portions, that is the portions which have been folded over to produce the channel 25 to receive the edge of the slide binder 10, have been extended inwardly a distance equal to the distance from the edge of the cardboard ready-mount to the opening or aperture therein.

Referring specifically to the clip member 15, it can be seen that the finger 20 shown in Figure 1 extends to the edge of the opening in the ready-mount and assists in holding the transparency 14 to thereby provide a more rigid structure which is not so susceptible to warping and popping.

A comparison of Figures 1 and 6 points up a further advantage to be achieved from the arrangement of the present invention. As has been mentioned, the subject photographed, and represented by the arrow 11, can be disposed either along the major axis of the transparency 14 or can be disposed perpendicular to this major axis. The ready-mount 10 of course must be inserted into the photographic projector in a correct manner to produce the proper image on the photographic screen. With the type of projector in which the slides are inserted one at a time by the operator, the operator must orient these slides by attempting to view them using the stray light filtering out of the case of the projector. The use of the clips 15 and 16 on the ready-mount 10 immediately informs the operator as to whether the transparency 14 has the subject aligned parallel to the major axis of the transparency, such as in Figure 6, or has the subject perpendicular to the major axis, as in Figure 1. As can be appreciated, this is of considerable aid to the operator of the projector.

Figure 7 shows a modified form of the protective clip. This modified clip is again in the form of a tube, however, in this case the tube is triangular in shape rather than circular, as it is in Figure 3. Figure 8 shows the clip of Figure 7, looking into the triangular tube or channel 35. Figure 9 is a section view of Figure 8, showing the manner in which the clip is formed by folding the rectangular shaped sheet of metal along the edges 36 and 37 to form the tube. As clearly shown in this figure, the modified clip has a generally triangular cross-section.

From the above description is can be seen that we have provided a protective clip to be used with a photographic ready-mount which tends to stiffen the ready-mount and prevent warping under the heat of a projection lamp, provides a protective surface for the edge of the ready-mount to prevent wear and fraying thereof, and provides a relatively wide operating surface against which the operating members of a photographic projector may operate. Such a structure overcomes many of the disadvantages of the ready-mount and incorporates many of the advantages of the permanent type slide binder at only a fraction of the cost thereof. Furthermore, while the protective clips of the present invention have many of the advantages of the permanent type slide binder these clips may be installed with comparative ease and in a much shorter period of time. A further advantage over the permanent type slide binder is the fact that the transparency of the ready-mount when used with the clips of the present invention is continuously exposed to the open air and if the unit is subjected to excessive moisture at any one time this moisture can evaporate when the environment is changed. However, with the permanent type slide binder the moisture tends to accumulate under the glass plates and it is very difficult to correct this without dis-assembling and perhaps destroying the permanent slide binder. In fact, in many cases this moisture is so minute that it is not noticed until the transparency enclosed between the two glass members has deteriorated to a certain extent, thereby substantially destroying the scene recorded on the transparency.

It is apparent that other modifications of the present invention will be apparent to those skilled in the art and it is intended that the scope of the present invention be limited solely by the scope of the appended claim.

We claim as our invention:

The combination comprising; a rectangular mounted transparency having a rectangular transparency held between layers of cardboard sealed together, the layers of cardboard having aligned openings through which the transparency may be viewed, and a pair of protective clip members mounted on opposite edges of said mounted transparency in a relationship to said transparency to indicate the proper position of said mounted transparency in a projector, each of said clip members being formed of a folded member of relatively thin resilient material having an inner dimension at the fold thereof greater than the composite thickness of said layers of cardboard and having a pair of parallel edges biased toward each other by the resiliency of the material of the clip and gripping the opposite faces of said layers of cardboard, each of said clips having an overall length slightly less than the length of the outside edge of said transparency and a width between the fold and the edges thereof no greater than the width of the cardboard layers between the edge thereof and the adjacent edge of the aligned openings therein, said protective clips functioning to provide edge surfaces at the folds thereof thicker than the layers of cardboard to insure proper operation of the mounted transparency in a photographic projector, to prevent wear of said cardboard with use in a projector, and to stiffen said mounted transparency to reduce buckling due to the heat of a projection lamp.

References Cited in the file of this patent

UNITED STATES PATENTS

| 759,902 | Mills | May 17, 1904 |
| 1,481,120 | Brombosz | Jan. 15, 1924 |
| 1,901,902 | Draper | March 21, 1933 |
| 2,048,359 | Snell | July 21, 1936 |
| 2,227,973 | Hood | Jan. 7, 1941 |
| 2,403,491 | Bogia | July 9, 1946 |
| 2,777,232 | Kulicke | Jan. 15, 1957 |